US010308111B2

(12) United States Patent
Busley et al.

(10) Patent No.: US 10,308,111 B2
(45) Date of Patent: *Jun. 4, 2019

(54) SELF-PROPELLED CONSTRUCTION MACHINE

(71) Applicant: Wirtgen GmbH, Windhagen (DE)

(72) Inventors: Peter Busley, Linz (DE); Olaf Gaertner, Linz (DE); Cyrus Barimani, Königswinter (DE)

(73) Assignee: WIRTGEN GMBH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,906

(22) Filed: Mar. 27, 2018

(65) Prior Publication Data

US 2018/0281589 A1 Oct. 4, 2018

Related U.S. Application Data

(63) Continuation of application No. 15/276,095, filed on Sep. 26, 2016, now Pat. No. 9,944,174, which is a (Continued)

(30) Foreign Application Priority Data

Nov. 21, 2013 (DE) .................. 10 2013 019 448

(51) Int. Cl.
*B60K 15/06* (2006.01)
*B60K 13/04* (2006.01)
(Continued)

(52) U.S. Cl.
CPC ............ *B60K 15/063* (2013.01); *B60K 13/04* (2013.01); *B60K 15/073* (2013.01); *E01C 21/00* (2013.01);
(Continued)

(58) Field of Classification Search
CPC ...... E01C 23/06; E01C 23/088; B60K 15/073; B60K 13/04
See application file for complete search history.

(56) References Cited

U.S. PATENT DOCUMENTS 4,196,827 A 4/1980 Leafdale
4,678,363 A 7/1987 Sterner
(Continued)

FOREIGN PATENT DOCUMENTS

CN 2594299 Y 12/2003
DE 10112353 A1 9/2001
(Continued)

OTHER PUBLICATIONS

European Search Report in corresponding European Patent Application No. EP 14 19 3110, dated Mar. 10, 2015, 5 pp. (not prior art).
(Continued)

*Primary Examiner* — Abigail A Risic
(74) *Attorney, Agent, or Firm* — Lucian Wayne Beavers; Patterson Intellectual Property Law, PC (57) ABSTRACT

A self-propelled construction machine, comprises a machine frame, on which a working unit is arranged, and comprises a drive unit for driving the working unit. An additive, in particular a urea solution for operating an exhaust gas treatment system, is provided in an operating material tank which is integrated in the fuel tank or water tank of the construction machine. The integration of the operating material tank in the fuel tank or water tank does not necessitate any modifications to the machine frame. The dimensions of the construction machine can also remain unchanged, since the fuel tank does not take up any extra space on the machine frame if the dimensions of the fuel tank or water tank are maintained.

20 Claims, 5 Drawing Sheets

Related U.S. Application Data continuation of application No. 14/537,050, filed on Nov. 10, 2014, now Pat. No. 9,457,653.

(51) Int. Cl.

| | | |
|---|---|---|
| *B60K 15/07* | (2006.01) | |
| *E01C 23/08* | (2006.01) | |
| *E01C 21/00* | (2006.01) | |
| *E01C 23/06* | (2006.01) | |
| *E01C 19/26* | (2006.01) | |
| *E02D 3/12* | (2006.01) | |
| *B60K 15/063* | (2006.01) | |
| *B60K 15/073* | (2006.01) | |
| *E01C 23/088* | (2006.01) | |
| *F01N 3/20* | (2006.01) | |

(52) U.S. Cl.
CPC .......... *E01C 23/065* (2013.01); *E01C 23/088* (2013.01); *F01N 3/2066* (2013.01); *B60Y 2200/41* (2013.01); *E01C 19/26* (2013.01); *E02D 3/12* (2013.01); *F01N 2590/08* (2013.01); *F01N 2610/02* (2013.01); *F01N 2610/1406* (2013.01); *Y02A 50/2325* (2018.01); *Y02T 10/24* (2013.01)

(56) References Cited

U.S. PATENT DOCUMENTS

| | | | |
|---|---|---|---|
| 5,590,976 A | 1/1997 | Kilheffer et al. | |
| 6,223,526 B1 | 5/2001 | Wissler et al. | |
| 6,938,928 B2 | 9/2005 | Pfohl et al. | |
| 6,966,723 B2 | 11/2005 | Zentner | |
| 7,976,106 B2 | 7/2011 | Berning et al. | |
| 8,025,459 B2 | 9/2011 | Buschmann et al. | |
| 8,661,793 B2 | 3/2014 | Yamashita et al. | |
| 8,695,827 B2 | 4/2014 | Klauer et al. | |
| 8,857,160 B2 | 10/2014 | Haeberer | |
| 9,457,653 B2 | 10/2016 | Busley et al. | |
| 2008/0260461 A1 | 10/2008 | Berning et al. | |
| 2011/0232271 A1 | 9/2011 | Haeberer | |
| 2011/0272414 A1 | 11/2011 | Gaden et al. | |
| 2012/0067660 A1 | 3/2012 | Kashu et al. | |
| 2013/0037551 A1 | 2/2013 | Nishiyama et al. | |
| 2014/0161524 A1 | 6/2014 | Lacoe | |
| 2015/0259877 A1 | 9/2015 | Nishikawa et al. | |

FOREIGN PATENT DOCUMENTS

| | | |
|---|---|---|
| DE | 10333599 A1 | 2/2005 |
| DE | 102009000094 A1 | 7/2010 |
| DE | 102011100476 A1 | 12/2011 |
| DE | 102010039060 A1 | 2/2012 |
| DE | 202012012136 U1 | 3/2013 |
| DE | 102013207515 A1 | 11/2013 |
| EP | 1645452 A1 | 4/2006 |
| EP | 1970241 A2 | 9/2008 |
| EP | 2479393 A1 | 7/2012 |
| EP | 2876209 A1 | 5/2015 |
| JP | 50119842 A | 9/1975 |
| JP | 52032629 A | 3/1977 |
| JP | 2008248696 A | 10/2008 |
| WO | 2012118182 A1 | 9/2012 |

OTHER PUBLICATIONS

Notice of opposition filed re corresponding European patent EP2876209B1, dated Jun. 14, 2017, 19 pages (not prior art).
Machine translation of Notice of opposition filed re corresponding European patent EP2876209B1, dated Jun. 14, 2017, 20 pages (not prior art).
Exhibit KBS 1 to the EPO notice (not prior art).
Exhibit KBS 2 to the EPO notice (not prior art).
Exhibit KBS 6—Kaltfrase W 1000, dated Jul. 2000, 6 pages.
English translation of office action dated Mar. 19, 2018 in corresponding Japanese Application No. 2014-232611 (not prior art).

SELF-PROPELLED CONSTRUCTION MACHINE

BACKGROUND OF THE INVENTION

1. Field of the Invention

The invention relates to a self-propelled construction machine, in particular a road milling machine, recycler, stabiliser, finisher or roller, comprising a machine frame, on which a working unit is arranged, and comprising a drive unit for driving the working unit.

2. Description of the Prior Art

In road construction, self-propelled construction machines of different designs are used, including the known road milling machines, recyclers, stabilisers, finishers or rollers. Existing layers of the road surfacing can be removed using the known road milling machines and existing surfaces can be prepared using the recyclers. The stabilisers are used to stabilise soils that do not have sufficient load-bearing capacity, for example for road construction. The finishers are used to build roads, a distinction being drawn between asphalt finishers for laying asphalt and slip form finishers for laying concrete. Rollers are used to compress a wide range of materials in road construction, groundwork, agriculture and landfill construction. Construction machines of this type have a working unit for carrying out the work required for the building operations, which working unit may for example be a working roller, and in particular a milling roller equipped with milling tools in the case of road milling machines, stabilisers and recyclers. The working roller is driven by a drive unit which has at least one internal combustion engine. The fuel for the internal combustion engine, in particular a diesel engine, is provided in a fuel tank, in particular a diesel fuel tank.

Furthermore, it is known that construction machines comprise a water tank for storing service water. This service water is used for example in the known road milling machines in order to ensure that, during the milling process, the milling tools are cooled and thus the service life is increased, or is used in the known rollers in order to remove dirt from the roller lining and thus prevent the work result from being negatively impacted. Along with fuel and water, additional operating materials are also required for the operation of the construction machine. Therefore, in addition to the fuel tank and water tank, the known construction machines also have one or more operating material tanks arranged on the machine frame.

US 2008 260 461 A1 discloses a self-propelled construction machine comprising a drive unit having two internal combustion engines for the milling roller.

A general problem of construction machines is the limited space available for accommodating all the machine components. The construction machine should have as compact a design as possible in order to be able to keep a sufficiently wide lane open for moving traffic, to be able to be used even in confined spaces and to allow the construction machine to be transported without special permits.

A particular problem of construction machines comprising internal combustion engines is the ever stricter exhaust emission regulations. New exhaust emission regulations make it compulsory for exhaust gases to be treated further by means of additional technology. One known technique for post-treatment of exhaust gases is selective catalytic reduction (SCR). When using construction machines in different countries, the problem still arises of having to comply with various emissions guidelines. The engine technology and exhaust gas treatment technology required to comply with stricter emissions guidelines place high demands on fuel quality, for example low sulphur content, but this cannot be guaranteed in all countries. If fuel of sufficient quality is not available in individual countries, a construction machine having an exhaust gas treatment system cannot be used. It is therefore necessary to produce various designs of construction machines for different countries, the engine technology and exhaust gas technology of which machines are adapted to the respective general conditions. However, producing different configurations increases production complexity, the overall result of which is higher production costs, in particular in the case of small-batch production.

Exhaust gas treatment systems require additives, in particular a urea solution which has to be provided in an additional operating material tank. In one configuration of the construction machine having an exhaust gas treatment system, it is necessary to provide a urea solution, although this is not the case in a configuration without an exhaust gas treatment system. Equipping the construction machine with an exhaust gas treatment system means that changes have to be made to the chassis of the construction machine in order to attach the operating material tank. Otherwise, accommodating an additional tank increases the dimensions of the construction machine.

A sealed double-chamber tank for a motor vehicle is known from DE 10 2011 100 476 A1. The double-chamber tank has a single tank shell which is divided into two chambers. One chamber may hold diesel fuel and the other chamber may hold urea. DE 10 2011 100 476 A1 only describes the double-chamber tank in detail, and not the motor vehicle in which the double-chamber tank is installed. When the double-chamber tank is installed in the motor vehicle, the tank forms a separate component which is supported by the vehicle frame. DE 10 2009 000 094 A1 proposes integrating a tank for receiving a reducing agent in a fuel tank or washing water tank of a motor vehicle; however DE 10 2009 000 094 A1 also does not describe the motor vehicle comprising the fuel tank and the washing water tank in detail.

SUMMARY OF THE INVENTION

An object of the invention is to solve the problem of cost-effective production of self-propelled construction machines in different machine configurations for the respective countries while taking into account the limited space available. The object of the invention is in particular to provide additional operating materials in self-propelled construction machines with the limited space available without the need for major changes to the construction machine.

In one embodiment of a construction machine, in particular a road milling machine, recycler, stabiliser or roller, the additive, in particular the urea solution for operating the exhaust gas treatment system, is provided in an operating material tank integrated in the fuel tank. An alternative embodiment provides the integration of the fuel tank in a water tank of the construction machine, which the known construction machines generally have. When integrating the operating material tank in the fuel tank, however, the construction machine does not need to have a water tank.

Furthermore, the construction machine may be distinguished in that at least the fuel tank is formed from parts of the machine frame when the operating material tank is integrated in the fuel tank; however, when the operating material tank is integrated in the water tank, at least the water tank is formed from parts of the machine frame.

The integration of the operating material tank in a tank formed from the machine frame is advantageous since the structural complexity and the complexity of assembling various machine configurations can be kept as low as possible, and it is possible to standardise the parts used and to thus optimise the manufacturing costs. Furthermore, the complexity of subsequently upgrading or retrofitting the machine is reduced, since additional components can be integrated in the machine frame without further adaptations. The integration of the operating material tank in the fuel tank or water tank does not necessitate any changes to the machine frame, and therefore different production lines for construction machines having or not having exhaust gas treatment systems are not necessary.

Integrating the operating material tank in the fuel tank or water tank allows a standard machine frame to be used for the different machine configurations without major upgrading work. The decision regarding the machine configuration does not have to be taken until the final assembly stage, the operating material tank being built into the fuel tank or water tank in one case or the fuel tank or water tank being used without the operating material tank in the other case. Since the fuel tank or water tank is formed from parts of the machine frame, additional attachments are not required for each instance of equipping the machine.

When the operating material tank is integrated in the fuel tank or water tank, the dimensions of the construction machine can also remain unchanged, since the operating material tank does not take up any extra space on the machine frame. It has been found that the filling volume of the fuel tank or water tank is indeed reduced by arranging the operating material tank in the fuel tank or water tank. However, since the required amount of additive is relatively low by comparison with the amount of fuel or water, the dimensions of the fuel tank or water tank can remain unchanged in practice. Therefore, the structural modifications to the construction machine in order to retrofit an exhaust gas treatment system are minor. The operating material tank preferably has a filling volume that is at most 20%, in particular from 5 to 15%, of the filling volume of the fuel tank, when the operating material tank is integrated in the fuel tank. When the operating material tank is integrated in the water tank, the filling volume of the operating material tank is up to 20%, preferably from 2 to 7%, of the water tank.

The fuel tank has a filling volume that is generally between 200 and 1500 l. If the construction machine is a heavy milling machine, the filling volume of the fuel tank is between 1000 and 1500 l, whereas the filling volume is between 200 and 1000 l if the construction machine is a small milling machine. In the case of stabilisers, the filling volume of the fuel tank is between 800 and 1500 l, for example. The filling volume of the water tank is, depending on the machine type and the machine size, generally between 300 and 5000 l. Milling machines have a larger water tank, and heavy milling machines have a water tank having a filling volume of between 1500 and 5000 l, for example. In the case of small milling machines, the filling volume is between 500 and 1500 l, whereas stabilisers have a smaller (up to 500 l) water tank, or do not have a water tank.

In road milling machines, for example, the fuel tank is generally arranged in the central region of the machine frame. Owing to the static load in this region, the fuel tank is an integral component of the machine frame, for which reason replacement of the fuel tank is not possible. In the fuel tank, the operating material tank can be installed in a simple manner without major upgrading work, so that different machine configurations can be mounted without additional complexity during manufacturing.

A preferred embodiment of the invention provides for the operating material tank to be formed as an exchangeable unit which is designed such that the tank can be inserted into an opening in the fuel tank or water tank, the opening in the fuel tank or water tank being closed by the operating material tank. If the intention is to not equip the construction machine with an exhaust gas treatment system, the opening in the fuel tank or water tank simply has to be closed by a cover. In a construction machine having or not having an exhaust gas treatment system, the opening in the fuel tank or water tank for inserting the operating material tank can also be used for access for finishing, maintenance or servicing operations.

In a particularly preferred embodiment, the operating material tank has a trough part and a cover part, the cover part extending laterally beyond the trough part. If the operating material tank in inserted into the opening in the fuel tank or water tank, the operating material tank having the cover part, which extends laterally beyond the trough part, rests on the fuel tank or water tank, it being possible for the cover part of the operating material tank to be sealed with respect to the fuel tank or water tank in a simple manner.

The operating material tank has a closable tank opening which is preferably arranged on the cover part so as to be able to fill up the operating material tank from the side on which the tank is easily accessible.

The cover part of the operating material tank preferably has a peripheral rim to create a collection trough for additive that overflows during refilling. This prevents urea solution from entering the fuel tank or water tank and/or reaching components of the construction machine that are at risk of corrosion. In order to drain the urea solution, the cover part has an outflow opening having an outflow conduit, by means of which the solution can be guided to the ground without coming into contact with parts of the construction machine. For example, the outflow conduit can lead into or next to the milling roller housing.

The operating material tank can include different materials. Preferably, the operating material tank is a metal tank, in particular an aluminium tank, the inside of which is provided with an anti-corrosion coating, in particular a polyethylene coating.

The operating material tank can have a separate operating material removal unit for each internal combustion engine of the drive unit, which removal unit is preferably inserted into an operating material removal opening in the tank, so that the removal unit can be mounted and demounted in a simple manner. The simple mounting and demounting of the removal unit as a separate component in particular simplifies the equipping or retrofitting of an existing construction machine with the exhaust gas treatment system and the associated operating material tank. In addition to a suction conduit extending towards a low point of the operating material tank, the operating material removal unit can also contain additional components, such as a heating system, a temperature measurement device, sensors, or one or more filters.

In the known construction machines, in which the machine frame is carried by front and rear running gears, the fuel tank having the operating material tank is preferably arranged on the machine frame between the front and rear running gears. A preferred embodiment provides for the arrangement of the fuel and operating material tank between the front and rear running gears, the fuel tank preferably being located below the control platform. This is advantageous in that the operating material tank can be easily accessed from the control platform.

A further particularly preferred embodiment provides that the fuel and operating material tank is covered by at least one tread plate which is arranged above the fuel tank. The tread plate has a preferably closable access opening which is arranged above the tank opening in the operating material tank. A further advantage of the tread plates is the vibration isolation of the machine operator's platform from the machine frame.

In a self-propelled road milling machine, in order to make optimum use of the available space and/or for reasons of optimum weight distribution, the drive unit for the working unit is arranged on the machine frame preferably behind the fuel tank with reference to the working direction of the construction machine and the water tank is preferably arranged in front of the fuel tank with reference to the working direction of the construction machine. In a self-propelled stabiliser, in order to make optimum use of the available space and/or for reasons of optimum weight distribution, the drive unit for the working unit is arranged on the machine frame preferably in front of the fuel tank with reference to the working direction of the construction machine, the fuel tank preferably being arranged in the rear region of the machine frame. The water tank is arranged on the machine frame preferably in front of the working unit with reference to the working direction of the construction machine.

BRIEF DESCRIPTION OF THE DRAWINGS

In the following, embodiments of the invention will be described in more detail with reference to the drawings, in which.

DETAILED DESCRIPTION

Figure 1:
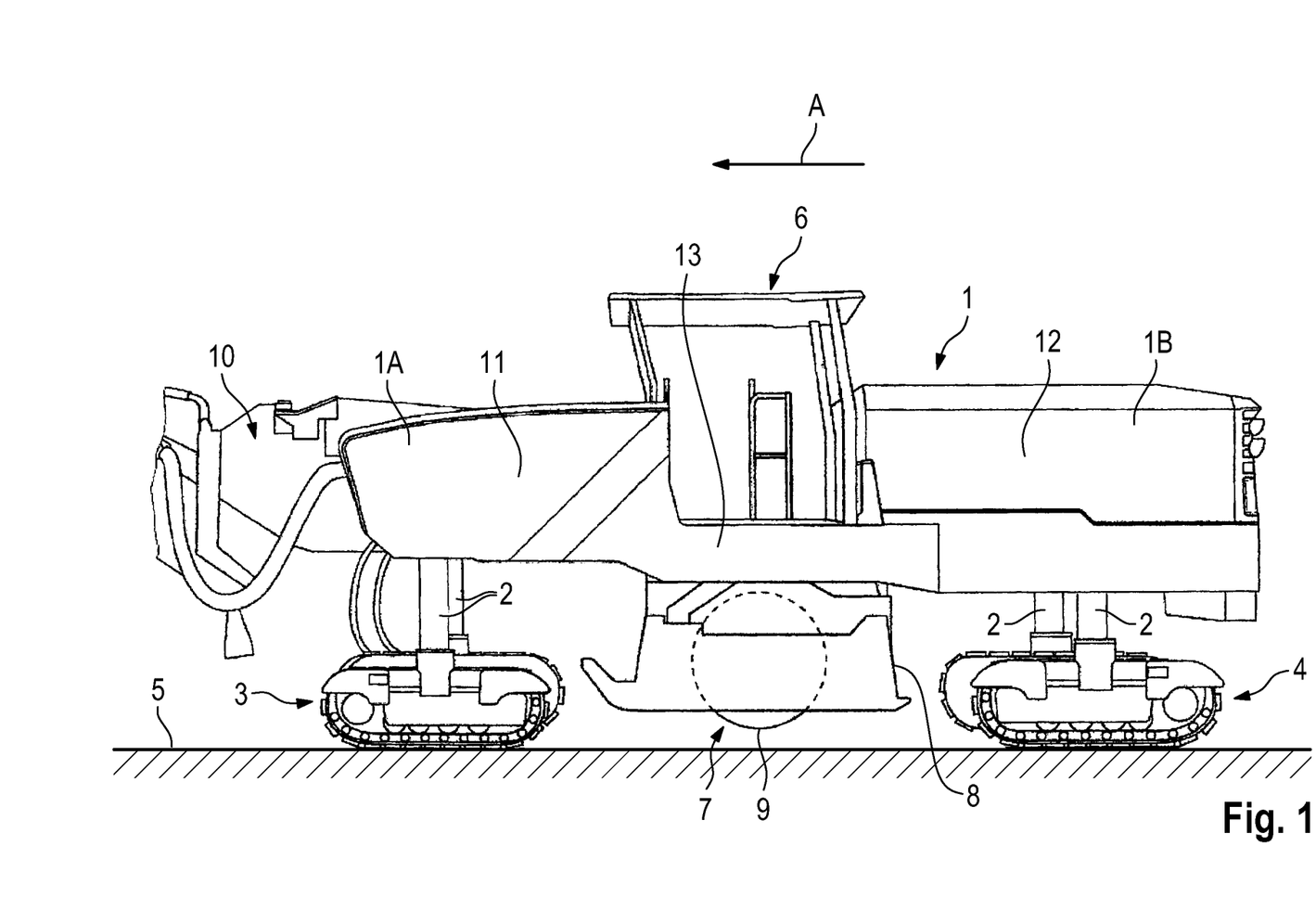
FIG. 1 is a simplified side view of a road milling machine as an example of a construction machine.

As an example of a construction machine, FIG. 1 shows a front-loader road milling machine which has a machine frame 1, to which front and rear running gears 3, 4, in particular crawler track running gears, are attached via lifting columns 2, so that the machine frame 1 is adjustable in height relative to the ground 5. The running gears 3, 4 may also be wheels. The control platform 6 is arranged between the front and back part 1A, 1B, with reference to the working direction A, of the machine frame 1. A working unit 7 is located on the machine frame 1 below the control platform 6 and comprises a milling roller 9 arranged in a milling roller housing 8. The milled material is conveyed away by a conveying device 10, which is only shown in part in FIG. 1.

A water tank 11 for holding water for cooling the milling tools of the milling roller 9 is arranged on the front part 1A of the machine frame 1 in front of the control platform 6, while a drive unit 12 for driving the milling roller 9 is arranged on the back part 1B of the machine frame 1 behind the control platform 6. The drive unit 12 comprises at least one internal combustion engine (not shown), in particular a diesel engine, having an exhaust gas treatment system (not shown in FIG. 1). The fuel, in particular diesel fuel, is provided in a fuel tank 13 (FIGS. 2 and 3) which can have a filling volume of from approximately 1000 to 1500 l. The diesel tank is arranged on the machine frame 1 below the control platform 6 and above the working unit 7 between the front and back part 1A, 1B, with reference to the working direction, of the machine frame 1. The water tank 11 may have a filling volume that is up to 5000 l.

Figure 2:
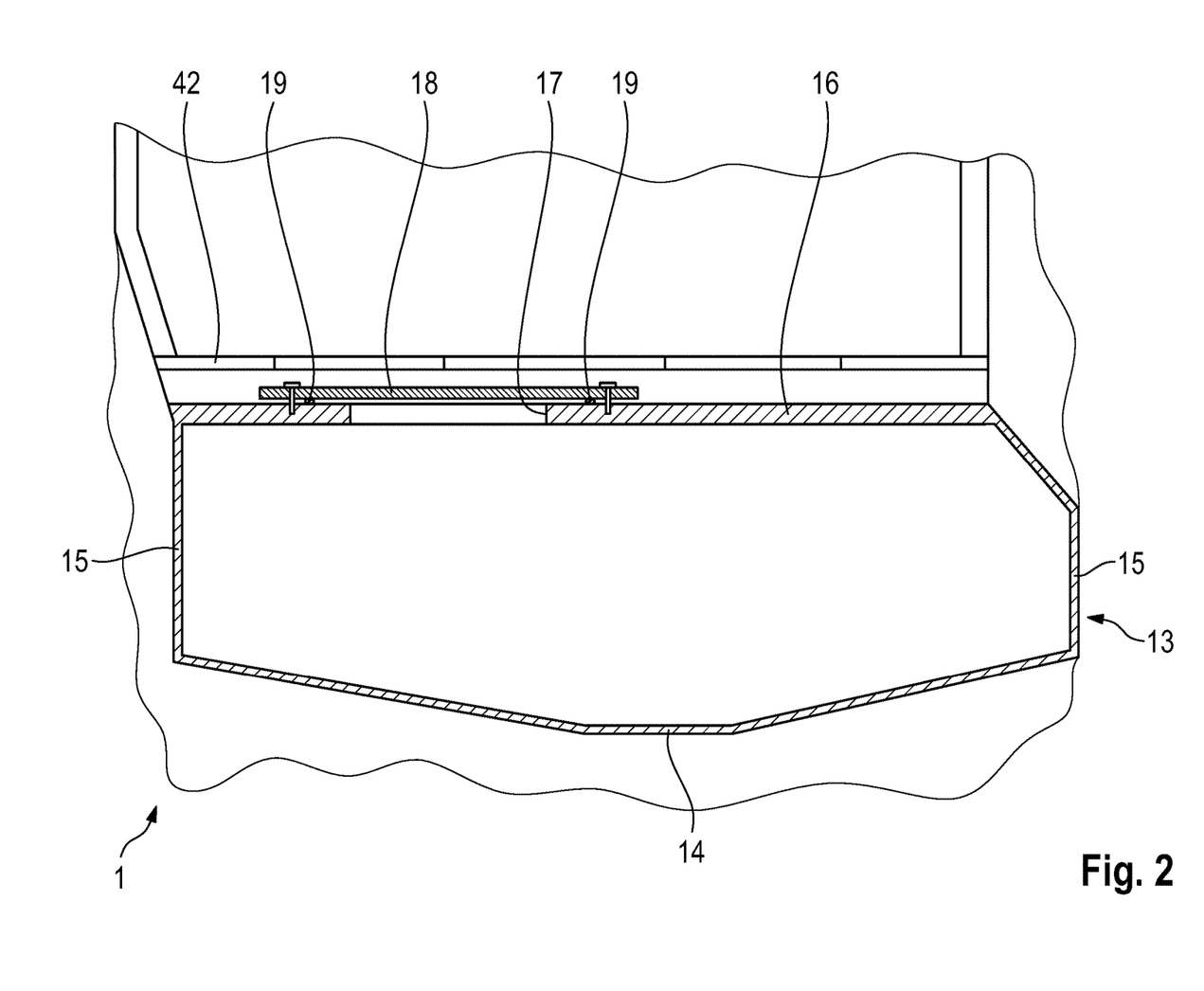
FIG. 2 shows the part of the machine frame of the construction machine of FIG. 1 below the control platform, the access opening in the fuel tank being closed by a cover.

FIG. 2 is a simplified schematic view of a section through the part of the machine frame 1 below the control platform 6. The fuel tank 13 has a bottom part 14, side parts 15 and a cover part 16, the parts of the fuel tank being formed from parts of the machine frame 1. The fuel tank 13 is thus an integral component of the machine frame 1 of the construction machine. The fuel tank 13 can be filled with fuel via a lateral tank connection piece (not shown).

The cover part 16 of the fuel tank 13 has an access opening 17 which has a substantially rectangular shape of sufficient size to allow finishing, maintenance or servicing operations to be carried out on the inside of the fuel tank. Such access openings are known in the prior art and are referred to as manholes and the closure thereof as manhole covers, because, depending on requirements, they are dimensioned such as to allow a person to climb into the tank. If the dimensions are smaller, they are referred to as handholes and handhole covers. In a road milling machine that has a drive unit 12 having an internal combustion engine without an exhaust gas treatment system, the access opening 17 is tightly sealed by a cover 18 which is screwed to the cover part 16 of the fuel tank 13 with a seal 19 being placed therebetween (FIG. 2).

Figure 3:
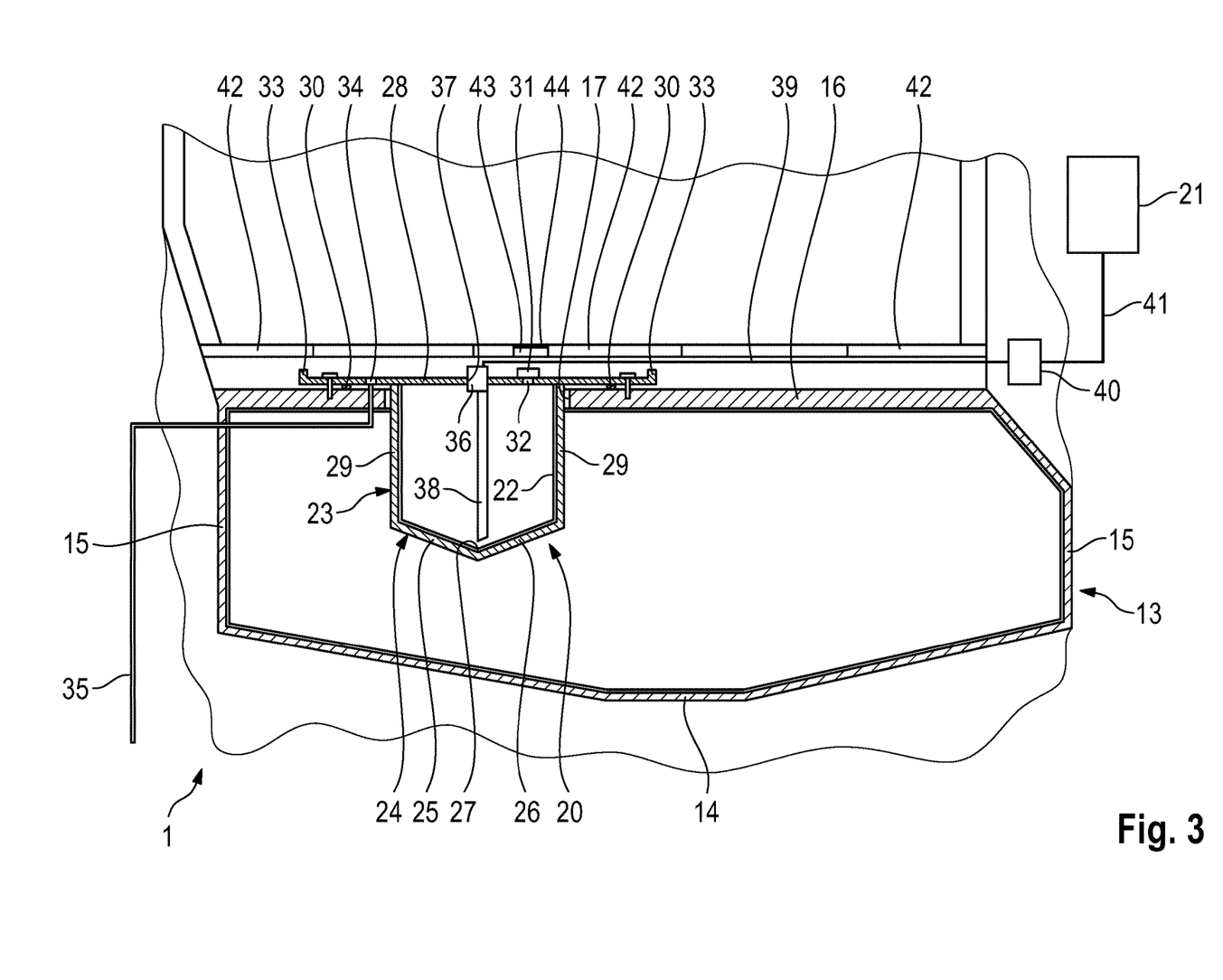
FIG. 3 is a simplified schematic view of the part of the machine frame of the construction machine of FIG. 1 below the control platform with the operating material tank integrated in the fuel tank.

FIG. 3 shows the construction machine equipped with an operating material tank 20 for holding an additive. The operating material tank 20 is filled with a urea solution which is provided for operating an exhaust gas treatment system 21 (only shown indicatively). Said tank forms a modular unit which is inserted with an exact fit into the fuel tank 13 when the cover 18 (FIG. 2) is removed. The operating material tank 20 is a metal tank, in particular an aluminium tank, the inside of which is coated with a polyethylene coating 22 to protect against corrosion. The filling volume of the operating material tank 20 is for example from 5 to 20%, in particular up to 15%, for example approximately 10%, of the filling volume of the fuel tank 13.

The operating material tank 20 has a trough part 23 having a bottom part 24 which includes two bottom plates 25, 26 extending obliquely with respect to one another, so that the tank 20 has a low point 27. The trough part 23 is sealed by a cover part 28 which extends outwards beyond the side parts 29 of the trough part 23, so that the cover part 28 of the operating material tank 20 rests on the cover part 16 of the fuel tank 13. The cover part 28 of the operating material tank 20 is screwed to the cover part 16 of the fuel tank 13 with a seal 30 being placed therebetween, so that the fuel tank is tightly sealed. The operating material tank 20 has a tank opening 32 which is sealed by a tank cover 31 and is provided on the cover part 28. The cover part 28 of the operating material tank 20 has a peripheral rim 33, so that the cover part is formed as a collection trough in order to collect operating material that overflows during refuelling. An outflow opening 34 having an outflow conduit 35 leading towards the ground is provided on the cover part 28 and can terminate in the milling roller housing 8, which is open downwards.

To remove the additive, an operating material removal unit 36 is provided which is inserted into an operating material removal opening 37 in the cover part 28 of the operating material tank 20. The operating material removal unit 36 has a suction conduit 38 which extends as far as the low point 27 of the tank 20. A conduit 39 is connected to the removal unit 36 and leads to a suction pump 40. An operating material conduit 41 leads from the suction pump 40 to the exhaust gas treatment system 21 of the internal combustion engine (not shown) of the drive unit 12. To supply a second internal combustion engine of the drive unit 12, a second removal unit can also be provided in addition to the first operating material removal unit 36.

Tread plates 42 are arranged on the control platform 6 above the fuel and operating material tank 13, 20 at a distance from the cover parts 16, 28. An access opening 43, which is sealed by a pivotable cap 44, is located above the tank opening 32 in the operating material tank 20 in one of the tread plates 42.

FIGS. 2 and 3 show that equipping the construction machine with an additional operating material tank 20 does not necessitate any major structural modifications, the dimensions of the machine not being increased either.

Figure 4:
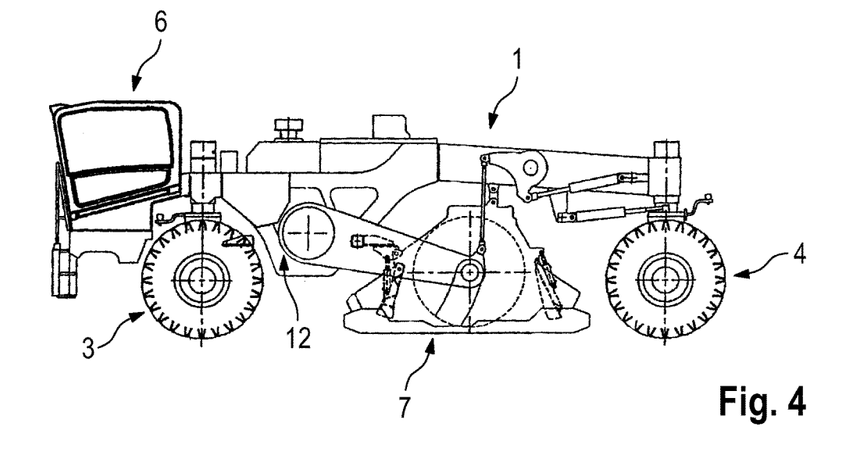
FIG. 4 is a simplified side view of a stabiliser as an example of a construction machine.
Figure 5:
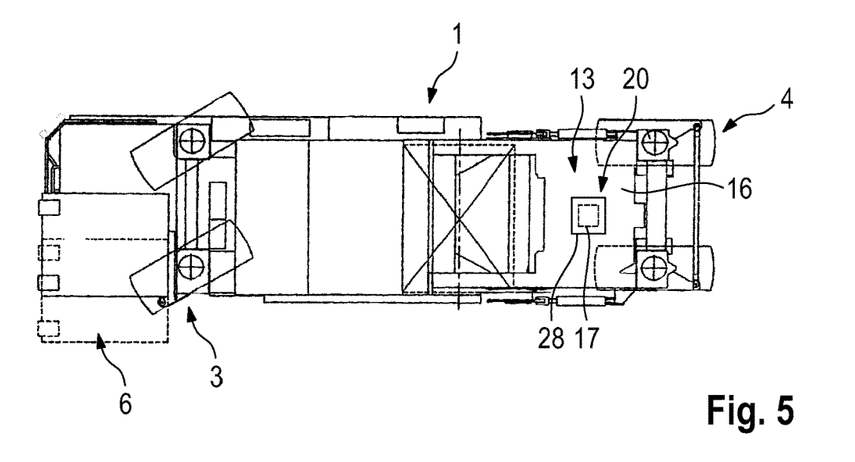
FIG. 5 is a plan view of the stabiliser, it being possible to see the operating material tank integrated in the fuel tank.

As another example of a construction machine, FIGS. 4 and 5 are side and plan views, respectively, of a stabiliser equipped with a fuel and operating material tank 13, 20, the operating material tank 20 being formed in the same way as the tank of the embodiment in FIGS. 1 to 3. The corresponding parts are provided with the same reference numerals. The stabiliser has front and rear running gears 3 and 4 which are carried by a machine frame 1. The control platform 6 is located in front of the front running gear 3 with reference to the working direction, the working unit 7 and the drive unit 12 being arranged behind the control platform 6 and between the running gears 2, 3. The fuel tank 13 is located in the rear region of the machine frame 1, the tank again being formed from parts of the machine frame 1. The operating material tank 20 is inserted into an access opening 17 (shown by dashed lines) in the cover part 16 of the fuel tank 13 and rests together with the cover part 28 on the cover part 16 of the fuel tank 13, so that the access opening 17 is tightly sealed.

Figure 6:
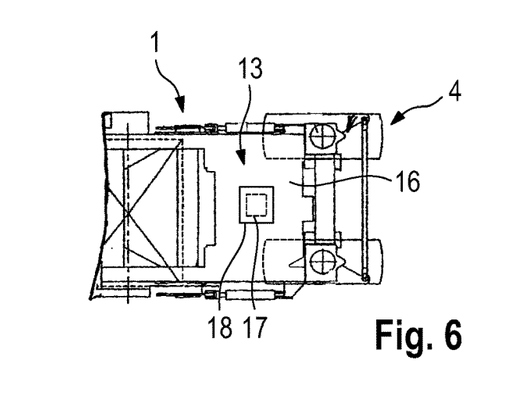
FIG. 6 shows a part of the machine frame of the stabiliser, an operating material tank not being provided.

FIG. 6 shows the back part of the machine frame 1, an operating material tank not being installed in the fuel tank 13. For this machine configuration, the access opening 17 of the fuel tank 13 is tightly sealed by a cover 18, structural modifications to the machine frame not being necessary.

Figure 7:
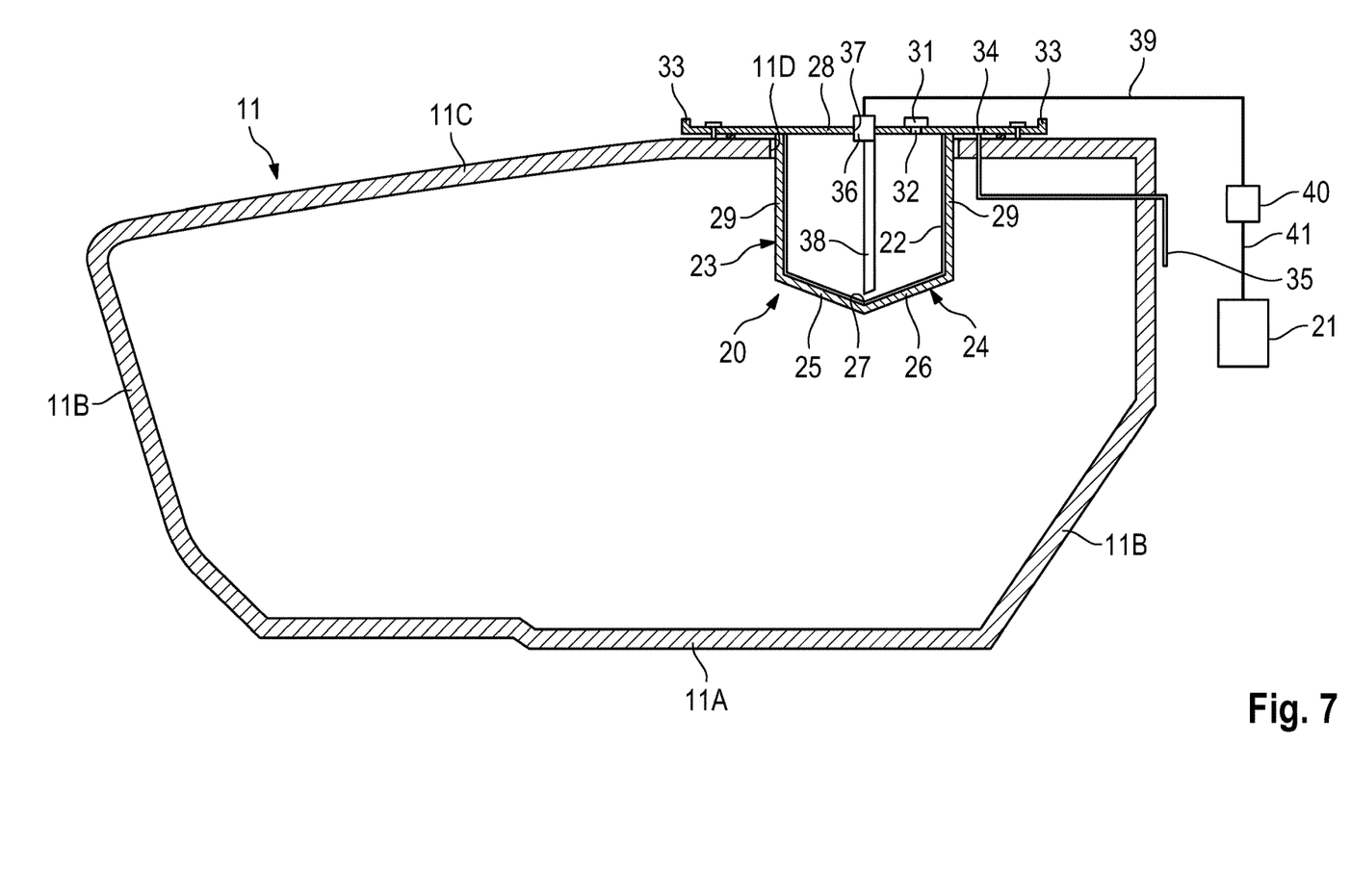
FIG. 7 shows a part of the machine frame of an alternative embodiment of the construction machine according to the invention comprising a fuel tank integrated in the water tank.

An alternative embodiment is shown in FIG. 7, in which the operating material tank is not integrated in the fuel tank but in the water tank. The corresponding parts are provided with the same reference numerals. The parts of the water tank 11 are formed from parts of the machine frame 1 in this embodiment too, so that the water tank 11 is thus also an integral component of the machine frame 1. In this embodiment, however, the fuel tank 13 does not have to be formed from parts of the machine frame 1. FIG. 7 is a section through the parts of the machine frame 1 that form the water tank 1. Like the fuel tank 13, the water tank 11 comprises a bottom part 11A, side parts 11B and a cover part 11C. There is an opening 11D in the cover part 11C, into which the operating material tank 20 is inserted. The operating material tank 20 inserted into the water tank 11 is, in the present embodiment, identical in construction to the operating material tank that is inserted into the fuel tank 13 (FIG. 3).

What is claimed is:

1. A self-propelled construction machine, comprising:
a machine frame;
a working unit arranged on the machine frame and configured to carry out work for a building operation;
a drive unit arranged on the machine frame and configured to drive the working unit, the drive unit including at least one internal combustion engine;
a first tank formed as an integral component of the machine frame, the first tank being either a fuel tank configured to hold fuel for the at least one internal combustion engine or a water tank; and
an operating material tank configured as an exchangeable unit removable from the first tank so that the first tank has a first capacity when the operating material tank is removed from the first tank, and a second capacity smaller than the first capacity when the operating material tank is received in the first tank, the operating material tank being configured to hold operating material.

2. The construction machine of claim 1, wherein:
the drive unit includes an exhaust gas treatment system; and
the operating material tank is configured to hold a urea solution additive for the exhaust gas treatment system, the urea solution additive being the operating material.

3. The construction machine of claim 1, wherein:
the first tank includes an access opening; and
the operating material tank is received in the access opening and seals the access opening.

4. The construction machine of claim 1, wherein:
the operating material tank includes a trough part and a cover part, and the cover part extends laterally beyond the trough part.

5. The construction machine of claim 4, wherein:
the cover part includes a sealable tank opening of the operating material tank.

6. The construction machine of claim 4, wherein:
the cover part of the operating material tank includes a peripheral rim;
the cover part includes an outflow opening; and
the machine further includes an outflow conduit connected to the outflow opening.

7. The construction machine of claim 1, wherein:
the operating material tank includes at least one operating material removal opening; and
the machine further includes at least one operating material removal unit inserted into the at least one operating material removal opening.

8. The construction machine of claim 7, wherein:
the operating material tank includes a low point; and
the at least one operating material removal unit includes a suction conduit extending toward the low point of the operating material tank.

9. The construction machine of claim 1, wherein:
the first tank is the fuel tank having a fuel tank filling volume; and
the operating material tank has an operating material tank filling volume up to 20% of the fuel tank filling volume.

10. The construction machine of claim 9, wherein:
the operating material tank filling volume is in a range of from 5% to 15% of the fuel tank filling volume.

11. The construction machine of claim 1, wherein:
the first tank is the water tank having a water tank filling volume; and
the operating material tank has an operating material tank filling volume up to 20% of the water tank filling volume.

12. The construction machine of claim 11, wherein:
the operating material tank filling volume is in a range of from 2% to 7% of the water tank filling volume.

13. The construction machine of claim 1, further comprising:
front and rear running gears supporting the machine frame; and
wherein the first tank is the fuel tank and the first tank is arranged between the front and rear running gears.

14. The construction machine of claim 1, further comprising:
a control platform arranged on the machine frame and
wherein the first tank is the fuel tank and the first tank is arranged below the control platform.

15. The construction machine of claim 1, wherein:
the first tank is the fuel tank;
the operating material tank includes an operating material tank opening; and
the construction machine further includes a tread plate arranged above the fuel tank, the tread plate including a sealable access opening arranged above the operating material tank opening.

16. The construction machine of claim 1, wherein:
the first tank is the fuel tank; and
the drive unit is arranged on the machine frame behind the fuel tank with reference to a working direction of the construction machine.

17. The construction machine of claim 16, further comprising:
a water tank arranged on the machine frame in front of the fuel tank.

18. The construction machine of claim 1, wherein:
the first tank is the water tank; and
the water tank is arranged in front of the working unit with reference to a working direction of the construction machine.

19. The construction machine of claim 1, wherein the construction machine is a road milling machine, a recycler, a stabiliser, a finisher or a roller machine.

20. The construction machine of claim 1, wherein:
a difference between the first capacity and the second capacity is substantially equal to a volume of the operating material tank.

\* \* \* \* \*